United States Patent
Aggus et al.

(10) Patent No.: US 7,792,284 B1
(45) Date of Patent: Sep. 7, 2010

(54) WASHABLE SHELL FOR A HANDHELD ELECTRONIC DEVICE

(75) Inventors: Trevor Aggus, Lincroft, NJ (US);
Robert Bopp, Hazlet, NJ (US); Warren Brown, Morganville, NJ (US); Linda Derechailo, Keyport, NJ (US); Rich Jaccard, Morganville, NJ (US); Steve Mak, Leonardo, NJ (US); Robert Randall, Rumson, NJ (US); Charles Truax, Ocean Township, NY (US); Greg Boothe, Thornton, CO (US)

(73) Assignee: Avaya Inc., Basking Ridge, NJ (US)

( * ) Notice: Subject to any disclaimer, the term of this patent is extended or adjusted under 35 U.S.C. 154(b) by 141 days.

(21) Appl. No.: 12/203,281

(22) Filed: Sep. 3, 2008

(51) Int. Cl.
*H04M 1/00* (2006.01)
*H04M 9/00* (2006.01)

(52) U.S. Cl. .................. 379/433.01; 379/437; 379/440

(58) Field of Classification Search .................. 379/419, 379/428.01, 433.01, 437, 440, 441, 451, 379/452
See application file for complete search history.

(56) References Cited

U.S. PATENT DOCUMENTS 4,973,847 A * 11/1990 Lackey et al. .......... 250/455.11
5,012,513 A * 4/1991 Dale et al. .................. 379/451

OTHER PUBLICATIONS

Whisper Phone, "Accelerate Learning with WhisperPhone!" 2008. 4 pp., Harebrain Inc., Minnesota, U.S.
Whisper Phone, Series G, G-36 Uniden 5.8GHz Water-Submersible Handset Phone, 1 p.

* cited by examiner

*Primary Examiner*—Tuan D Nguyen
(74) *Attorney, Agent, or Firm*—David Volejnicek (57) ABSTRACT

The shell of an electronic handheld device is adapted for easy and repeated—even frequent—assembly with and disassembly from the electronics, and the shell is washable, preferably in a dishwasher. Preferably, the shell comprises a plurality of parts that can be easily and repeatedly assembled and disassembled by hand without use of tools. For example, the parts of a telephone handset shell are made to be easily snapped together around, and unsnapped from, the handset's electronics, thereby enabling the shells of the handsets of telephones to be washed to have this function performed by unskilled personnel.

9 Claims, 8 Drawing Sheets

WASHABLE SHELL FOR A HANDHELD ELECTRONIC DEVICE

TECHNICAL FIELD

This invention relates generally to electronic devices, and relates specifically to hand-held communications devices.

BACKGROUND OF THE INVENTION

Electronic devices that are intended to come into contact with users need to be kept clean and sanitized. A typical such device is a telephone handset, which is intended to come into contact with users' hands and ears and into very close proximity to users' mouths. When dirty, the device could simply be discarded, but that is cost-prohibitive. Wiping down the device often does not clean the device sufficiently well. Washing-off the dirt usually cannot be done effectively because it would damage the electronics.

Some electronic devices are adapted for use in water, such as submersible portable telephones and "shower" radios. However, the cost involved in making these devices waterproof is high. Furthermore, the water-proofing often interferes with the device's operation. For example, the water-proofing of the telephone and radio interfere with and degrade their audio quality.

The WhisperPhone headset is "dishwasher-safe". However, it is a strictly-acoustical device that provides feedback of the user's speech to the user's ear, and has no electronics that could be damaged by water.

SUMMARY OF THE INVENTION

According to one aspect of the invention, the shell of an electronic handheld device is adapted for easy and repeated—even frequent—assembly with and disassembly from the electronics, and the shell is washable, preferably in a dishwasher. Preferably, the shell comprises a plurality of parts that can be easily and repeatedly assembled and disassembled by hand without use of tools. For example, the parts of a telephone handset shell are made to be easily snapped together around, and unsnapped from, the handset's electronics, thereby enabling the shells of the handsets of telephones to be washed to have this function performed by unskilled personnel.

According to another aspect of the invention, a device comprises electronics for interfacing with a user and a washable shell substantially surrounding the electronics and adapting the electronics for hand-held use by the user, the shell being adapted for repeated assembly with and disassembly from the electronics, preferably by hand without the use of tools. The shell is preferably washable in a dishwasher.

DETAILED DESCRIPTION

Figure 1:
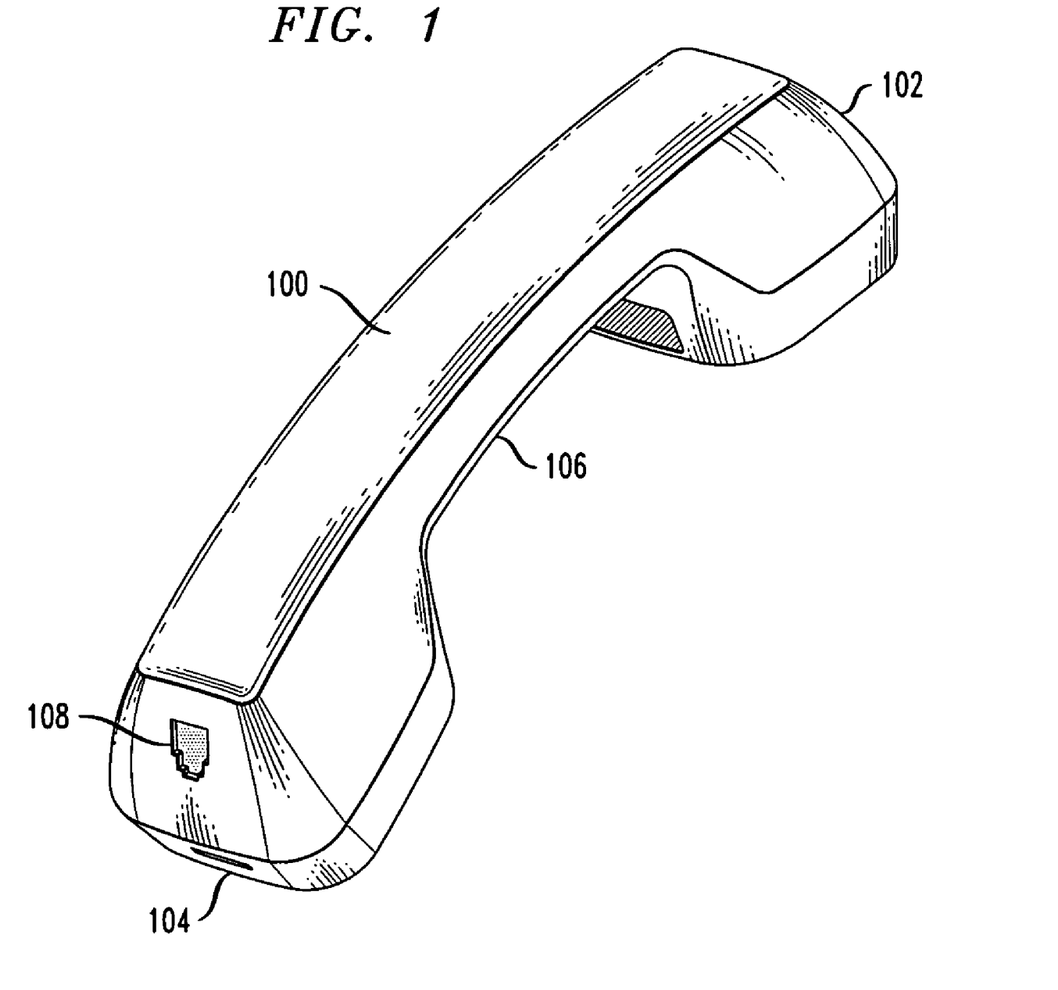
FIG. 1 is a plan view of a telephone handset that includes an illustrative embodiment of the invention.

FIG. 1 shows a telephone handset 100 comprising an earpiece 102, a mouthpiece 104, a handle 106 joining earpiece 102 to mouthpiece 104, and a jack 108 for a handset cord. As shown in the exploded view of telephone handset 100 in FIG. 2, telephone handset 100 comprises a shell 200 and a harness 206. When handset 100 is assembled, shell 200 houses harness 206 and adapts handset 100 to hand-held use. Shell 200 comprises a base 202 and a cover 204 that latch together to form a housing for harness 206.

Figure 3:
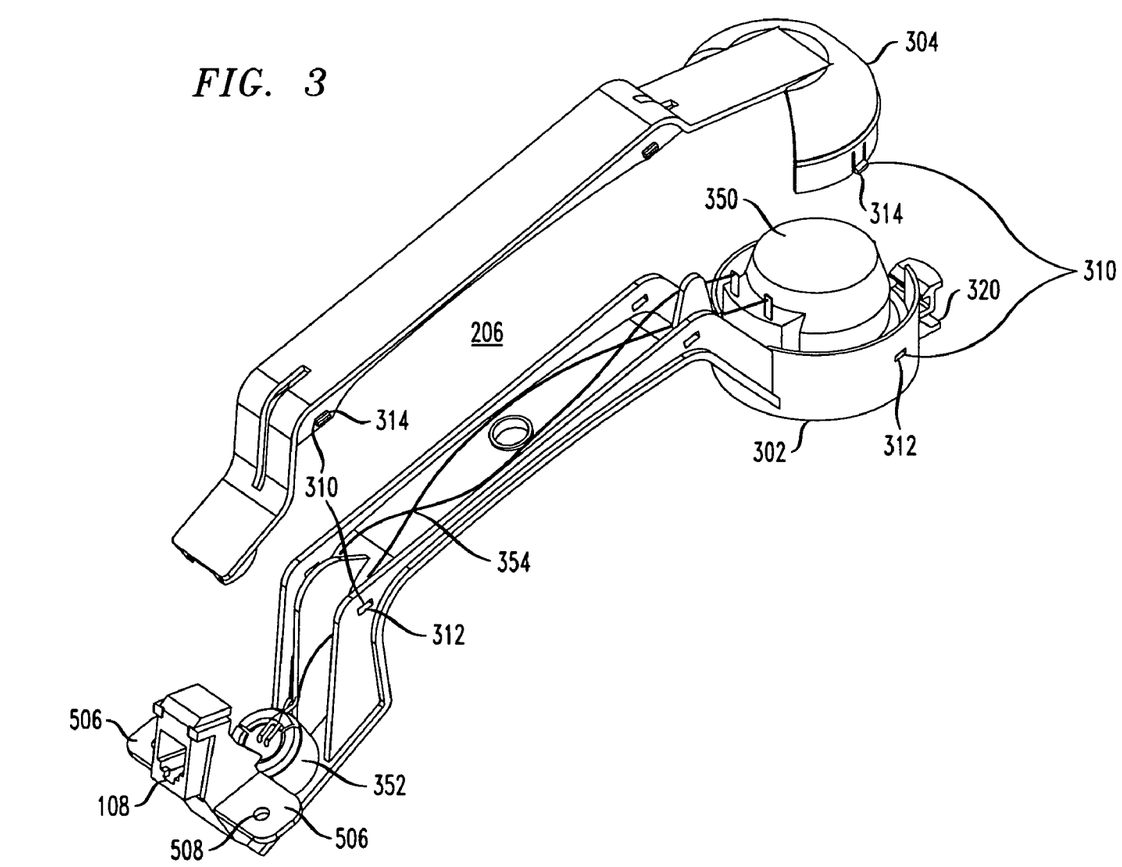
FIG. 3 is an exploded view line drawing of a harness of the telephone handset of FIG. 2.

As shown in the exploded view of harness 206 in FIG. 3, harness 206 comprises a carrier 302 for electronics 350, 352, 354, and a cap 304 that snaps onto carrier 302 to protect the electronics. The electronics interface with a user. In this instance, they do so communicatively: the electronics of this illustrative embodiment comprise a speaker 350, a microphone 352, and a plurality of conductors 354 that connect speaker 350 and microphone 352 to jack 108. The electronics and jack 108 are mounted on carrier 302. Cap 304 illustratively snaps onto carrier 302 via latches 310 that are formed by indents 312 in carrier 302 and corresponding tabs 314 in cap 304 that engage indents 312. When cap 304 and carrier 302 are snapped together, they encase and protect the electronics.

Shell 200, and optionally also carrier 302 and cap 304, are made of a dishwasher-safe material, such as Acrylonitrile Butadiene Styrene (ABS). This material is a terpolymer of acrylonitrile, butadiene and styrene. Usual compositions are about half styrene with the balance divided between butadiene and acrylonitrile. Considerable variation is possible, resulting in many different grades of ABS with a wide range of features and applications. In addition, many blends with other materials such as polyvinylchloride, polycarbonates and polysulfones have been developed. ABS can be processed by any of the standard thermoplastic processing methods.

Figure 5:
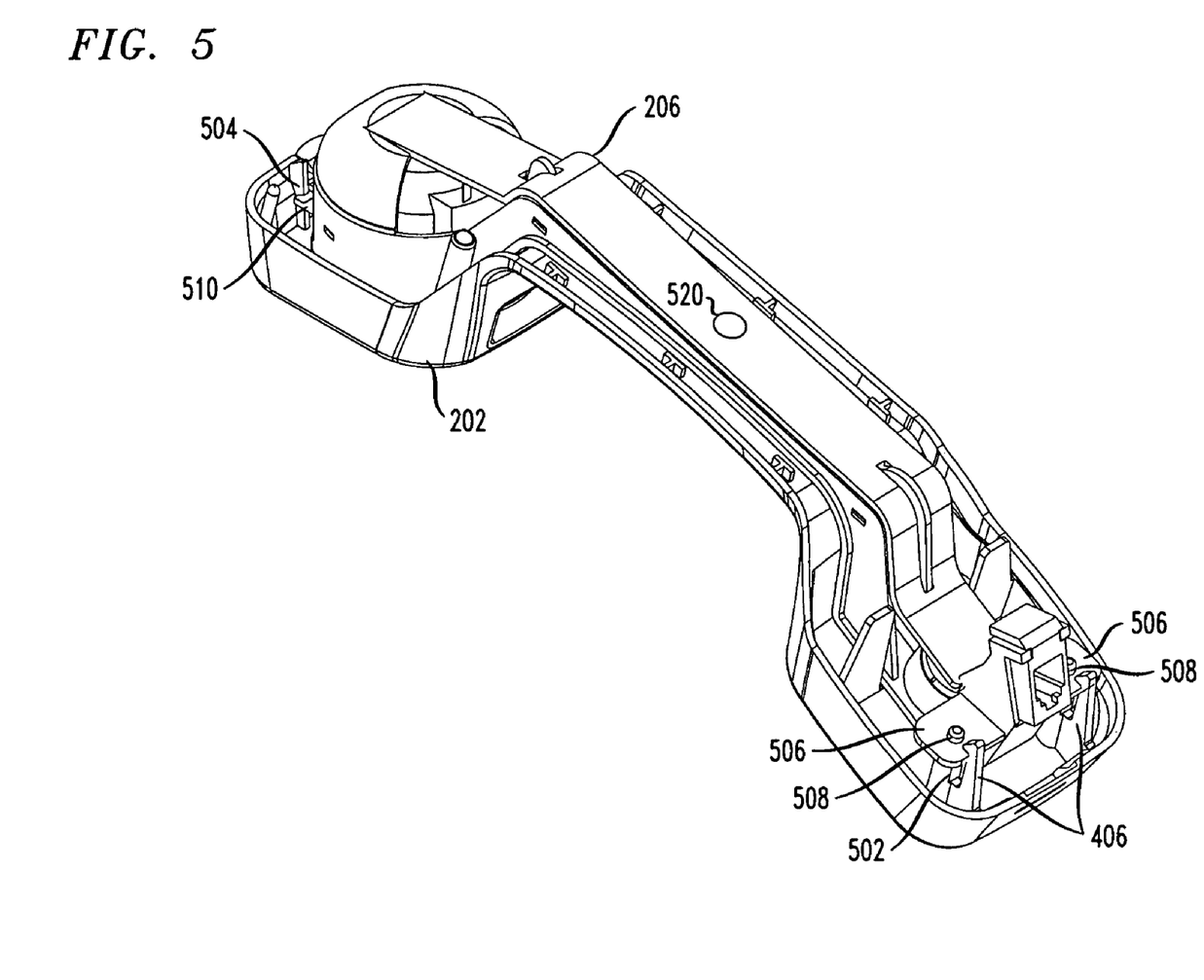
FIG. 5 is a perspective view line drawing of an assembly of the harness and the base of the handset of FIG. 1.
Figure 7:
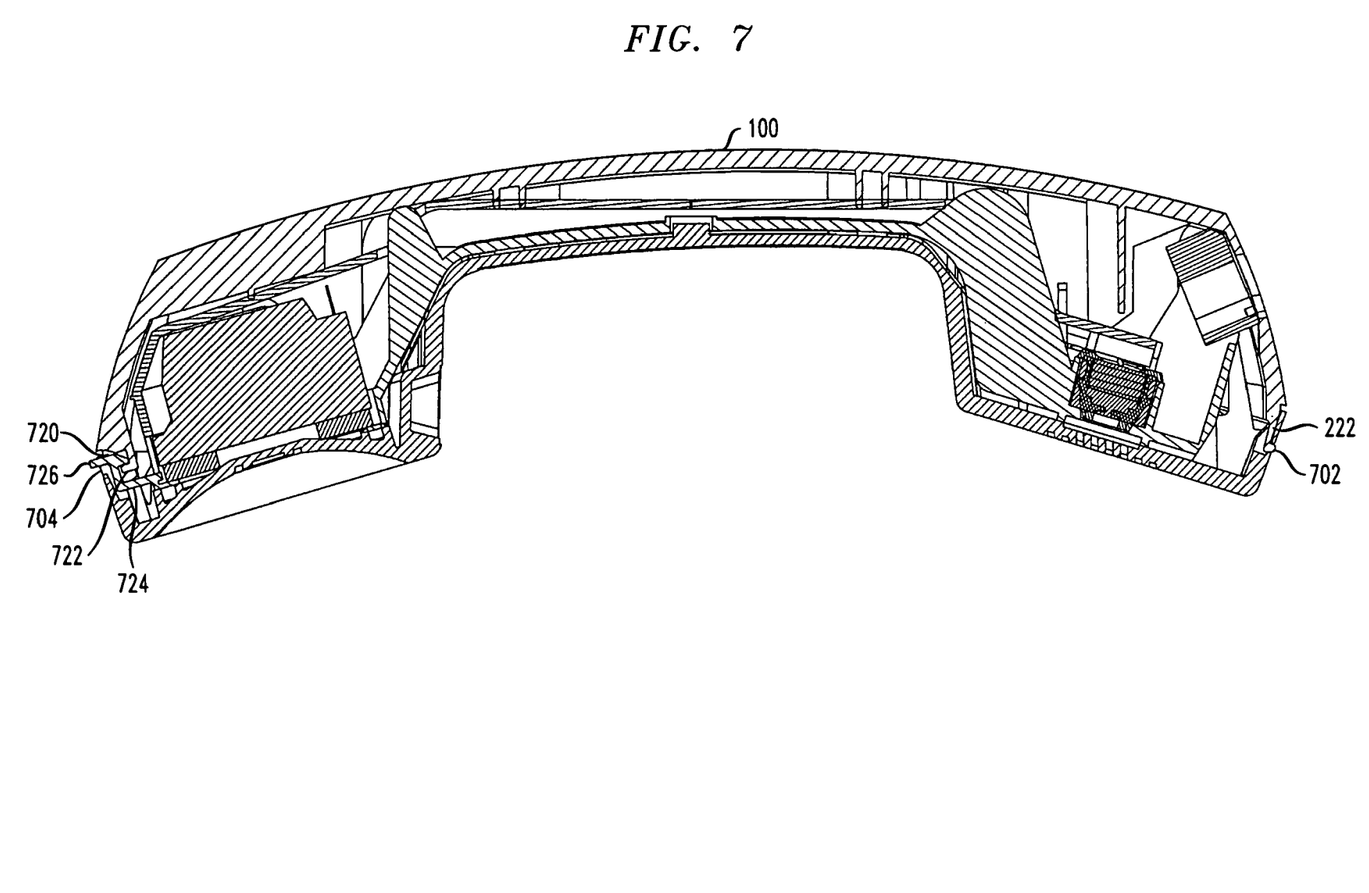
FIG. 7 is a sectional view line drawing of the handset of FIG. 1.

As shown in FIGS. 5 and 7, shell 200 comprises a pair of latches 502 and 504 that detachably attach harness 206 to base 202, and a pair of latches 702 and 704 that detachably attach cover 204 to base 202 and harness 206. Latches 502, 504, 702, and 704 are adapted to facilitate easy and repeated disassembly and reassembly of handset 100.

Figure 4:
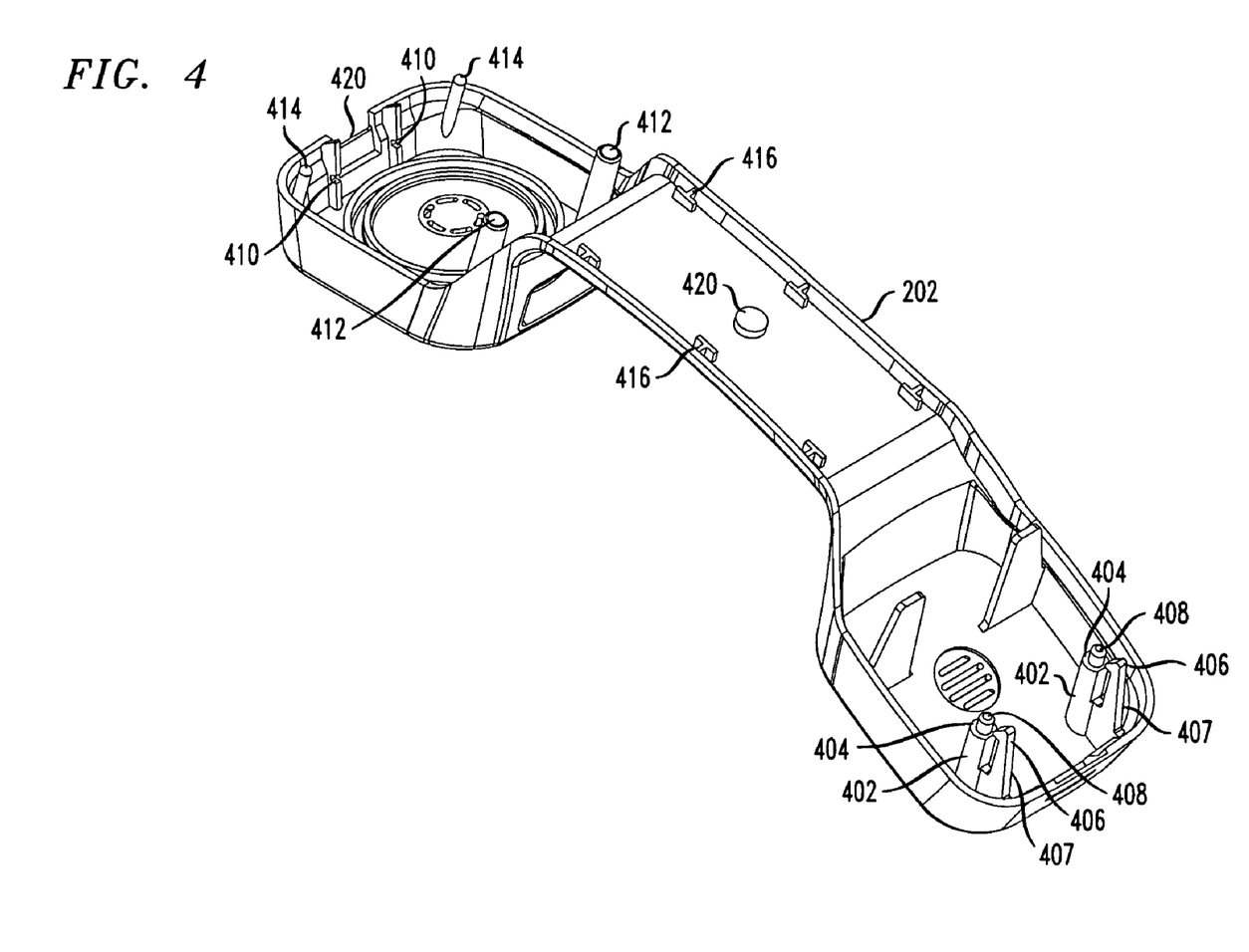
FIG. 4 is a perspective view line drawing of a base of the handset of FIG. 1.

As shown in FIGS. 4 and 5, latch 602 comprises a pair of hooks 406 on base 202 and a pair of corresponding tabs 506 on harness 206. When harness 206 is attached to base 202, hooks 406 engage tabs 506. Hooks 406 have flexible posts 407 that allow hooks 406 to be pushed away, and thus disengaged, from tabs 506.

Figure 6:
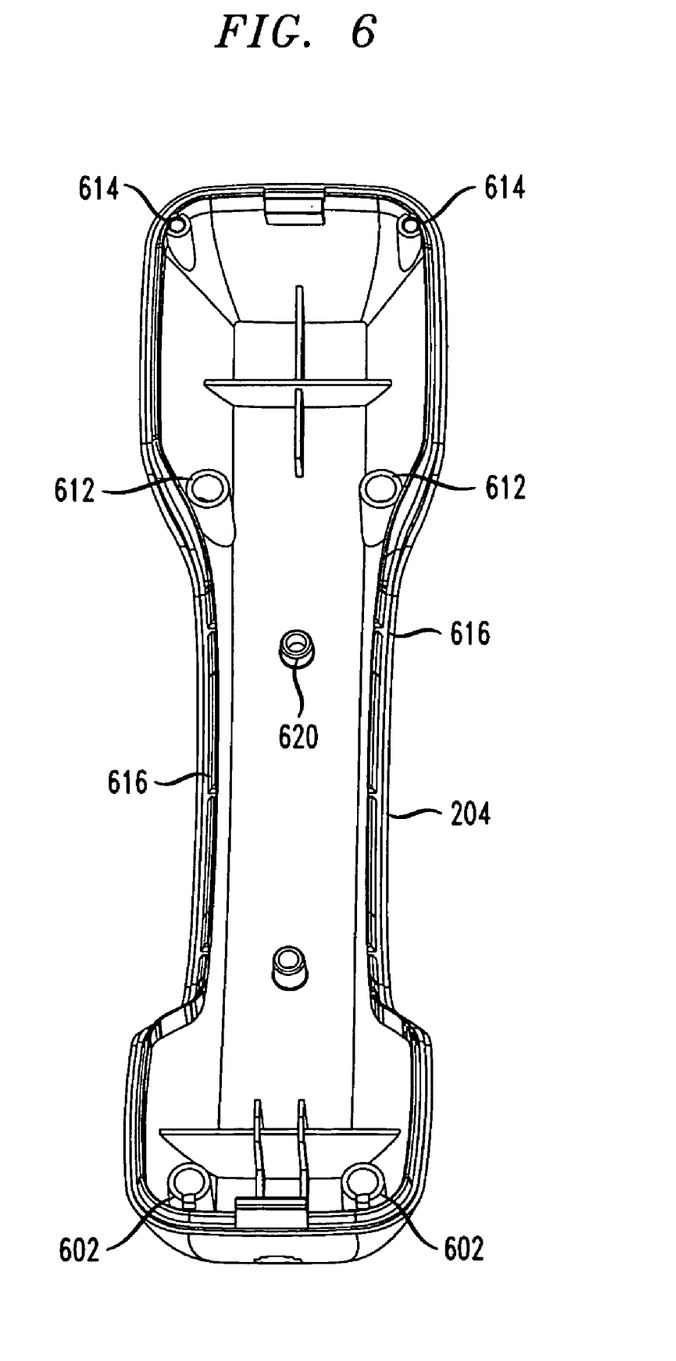
FIG. 6 is a perspective view line drawing of the inside of the cover of the handset of FIG. 1.

As shown in FIGS. 4 and 5, latch 504 comprises a pair of notches 410 in base 202 and a pair of corresponding tabs 510 on harness 206. As shown in FIG. 6, when harness 206 is attached to base 202, tabs 510 engage notches 410.

Figure 2:
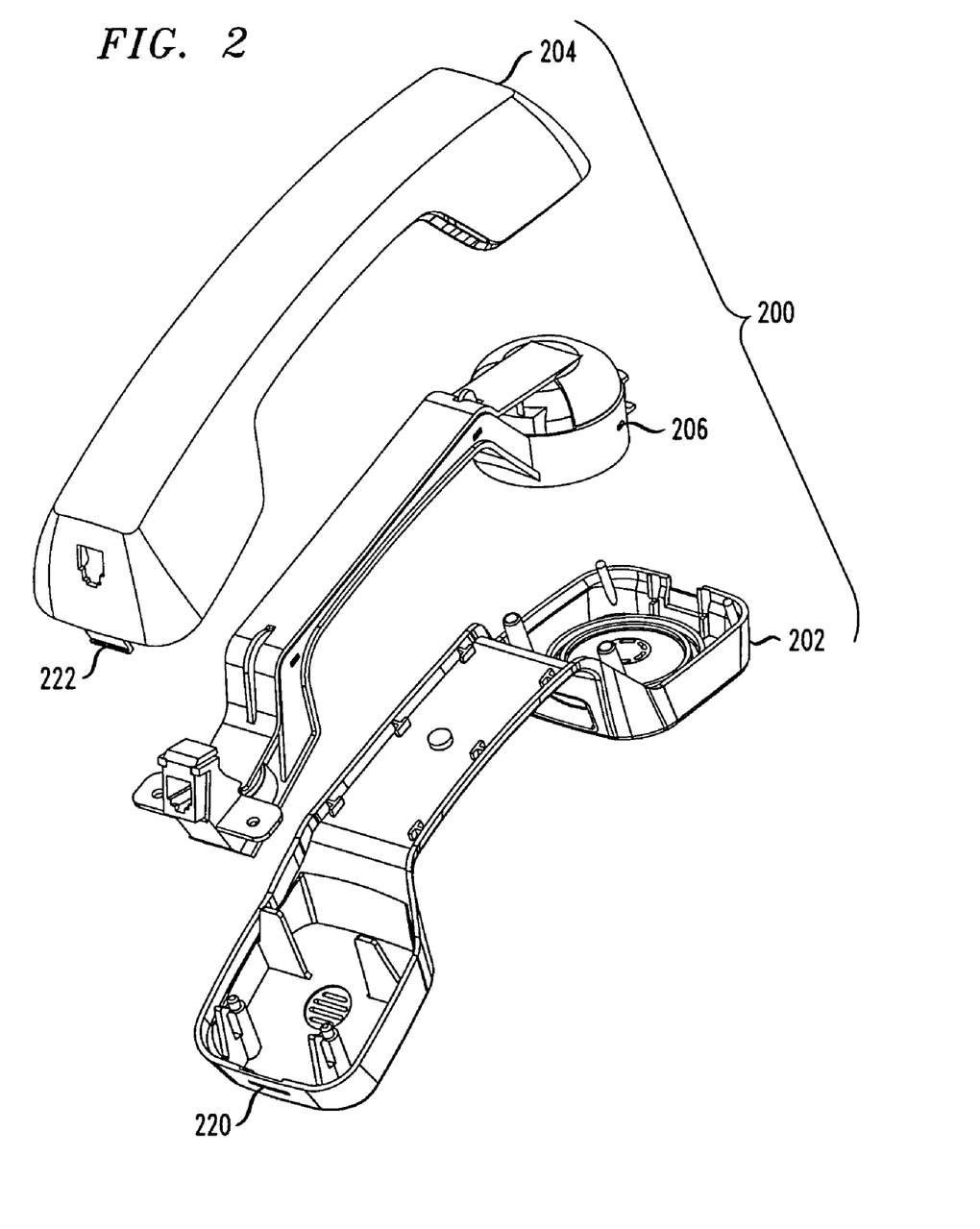
FIG. 2 is an exploded view line drawing of the telephone handset of FIG. 1.

As shown in FIGS. 2 and 7, latch 702 comprises a slot 220 and a hook 222. When cover 204 is mounted on base 202 and harness 206, hook 222 engages slot 220.

As shown in FIG. 7, latch 704 comprises a pair of reciprocal hooks 720 and 722. When cover 204 is mounted on base 202 and harness 206, hooks 720 and 722 engage each other. Hook 720 has a flexible leg 724, and a tab 726 that extends to the outside of shell 200 through a slot 420 (see FIG. 4) in base 202. Pressing on tab 726 causes leg 724 to flex and hook 726 to pivot out of engagement with hook 722.

Shell 200 further comprises a plurality of alignment members that properly align with each other, and hold in alignment, base 202, harness 206, and cover 204. As shown in FIGS. 4 and 5, base 202 comprises a pair of bosses 402 that define a pair of shoulders 404, and tabs 506 of harness 206 define a pair of corresponding holes 508. When harness 206 is attached to base 202, holes 508 engage ends 408 of bosses 402 and tabs 506 rest on shoulders 404. As shown in FIG. 6, cover 204 defines a pair of orifices 602. When cover 204 is mounted on base 202 and harness 206, orifices 602 engage ends 408 of bosses 402 that protrude through holes 508.

Figure 8:
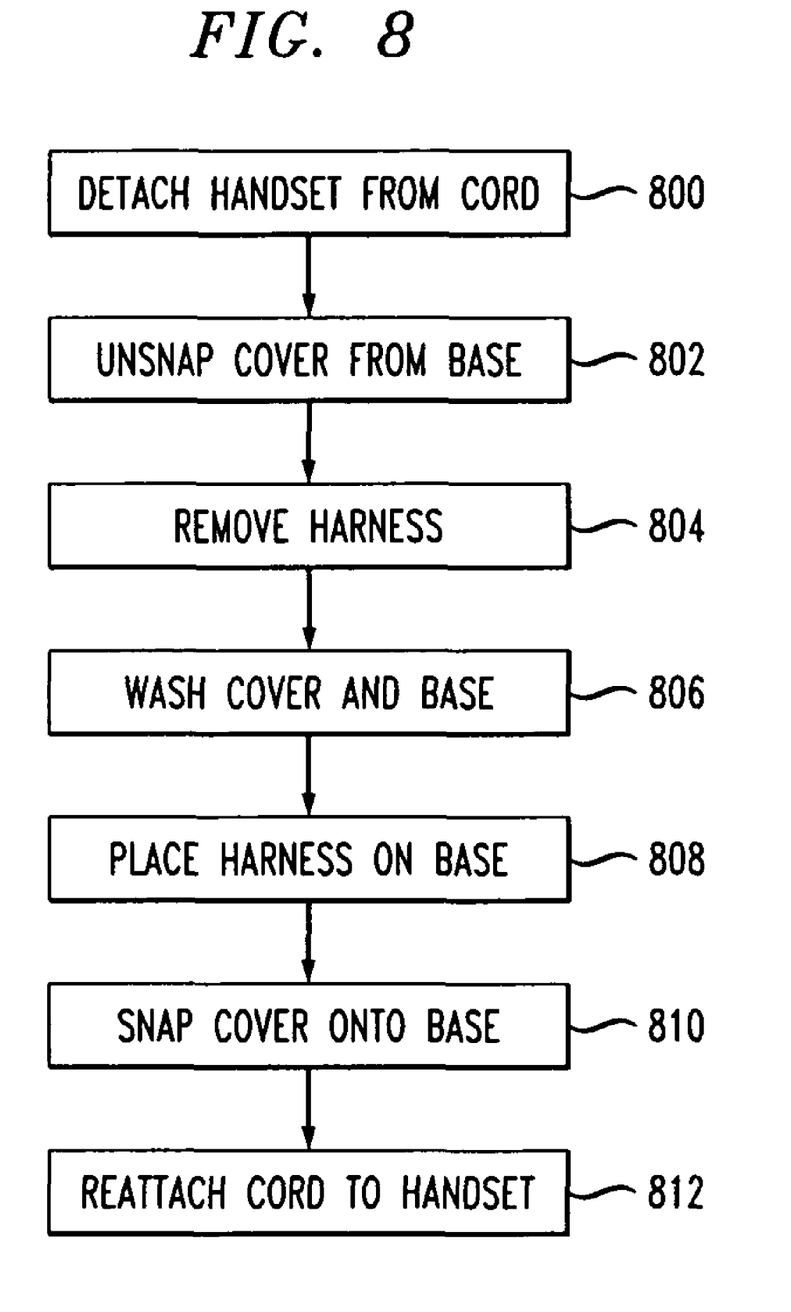
FIG. 8 is a flow diagram of the operation of cleaning the handset of FIG. 1.

As shown in FIG. 4, base 202 defines two pairs of posts 412 and 414, and as shown in FIG. 8, cover 204 defines two pairs of corresponding orifices 612 and 614. When cover 204 is mounted on base 202 and harness 206, orifices 612 engage posts 412 and orifices 614 engage posts 514.

Further as shown in FIG. 4, base 202 defines a plurality of key tabs 416, and as shown in FIG. 6, cover 204 defines a corresponding plurality of key notches 516. When cover 204 is mounted on base 202 and harness 206, notches 516 mate with tabs 416.

As shown in FIGS. 4, 5 and 6, base 202 may optionally define a boss 420, harness 206 may define a corresponding hole 520, and cover 206 may define a corresponding orifice 620. When shell 200 is assembled, base 420 protrudes through hole 520 and engages orifice 620. Further optionally, boss 420 may define a hold there through for a screw, and orifice 620 may define threads for engaging by the screw.

The purpose of the illustrative structure of the handset 100 described above is to facilitate easy assembly and disassembly of handset 100, preferably by hand without the need to use any tools, to enable washing of shell 200. FIG. 8 shows the steps involved in cleaning handset 100 by washing. A collector—such as a member of a hotel's janitorial staff, for example—detaches handset 100 from the handset cord of a telephone, at step 800, and brings the handset 100 to a cleaning location. At the cleaning location, a handler unsnaps cover 204 from base 202, at step 802, by depressing tab 726 and rotating cover 204 away from base 202 around a pivot formed by latch 702. The handler then detaches harness 206 from base 202, at step 804, by deflecting hooks 406 away from tabs 506 and rotating harness 206 away from base 202 around a pivot formed by latch 504, and provides base 202 and cover 204 to a washer. The washer runs base 202 and cover 204 through a dishwasher, at step 806, and provides the clean base 202 and cover 204 back to the handler. The handler reattaches harness 206 to base 202, at step 808, by inserting tabs 510 into notches 410 and then snapping tabs 510 into hooks 406, snaps cover 204 back onto base 202, at step 810, by inserting hook 222 into slot 220 and then snapping hook 722 into hook 720, and provides the reassembled handset 100 back to the collector. The collector then takes handset 100 back to the telephone and reattaches it to the telephone's handset cord, at step 812.

Of course, various changes and modifications to the illustrative embodiment described above will be apparent to those skilled in the art. For example, the invention is applicable not only to handsets, but to any handheld electronic devices, particularly those that interface with human users, such as portable telephones, personal digital assistants, handheld computers, remote controls, handheld radios, electronic gaming devices, etc. These changes and modifications can be made without departing from the spirit and the scope of the invention and without diminishing its attendant advantages. It is therefore intended that such changes and modifications be covered by the following claims except insofar as limited by the prior art.

What is claimed is:

1. A device comprising electronics for interfacing with a user; a washable shell substantially surrounding the electronics and adapting the electronics for hand-held use by the user, the shell being adapted for repeated assembly with and disassembly from the electronics, wherein the shell comprises a base and a cover that disattachably attaches to the base, the electronics are adapted for being mounted in the shell and wherein the electronics comprises a speaker and a microphone that together with the shell form a communication device.

2. The device of claim 1 wherein:
the shell when disassembled from the electronics is adapted for being washed in a dishwasher.

3. The device of claim 1 wherein:
the base and the cover snap together to form the shell.

4. The device of claim 1 wherein:
the cover is adapted to the base and unsnaps from the base by hand without use of tools.

5. The device of claim 1 further comprising:
a harness having the speaker and microphone mounted thereon.

6. The device of claim 5 further comprising:
a jack for a handset cord, mounted on the harness.

7. The device of claim 5 wherein:
the cover is adapted to snap to the base and unsnap from the base by hand without use of tools, and
the harness is adapted to be mounted on the base by hand without use of tools.

8. The device of claim 1 wherein:
the device is one of a telephone handset, a portable telephone, a personal digital assistant, a handheld computer, a remote control, a handheld radio, and an electronic gaming device.

9. The device of claim 1 wherein:
the shell is adapted for assembly with and disassembly from the electronics by hand without use of tools.

* * * * *